United States Patent [19]
Nanba

[11] 3,938,894
[45] Feb. 17, 1976

[54] FOCUS DETECTING DEVICE
[75] Inventor: Yasuhiro Nanba, Osaka, Japan
[73] Assignee: Minolta Camera Kabushiki Kaisha, Osaka, Japan
[22] Filed: Dec. 12, 1974
[21] Appl. No.: 532,120

[30] Foreign Application Priority Data
Dec. 29, 1973   Japan.................................. 49-1114

[52] U.S. Cl. .................... 356/125; 354/25; 356/123
[51] Int. Cl.² ......................................... G03B 13/18
[58] Field of Search........ 250/211 J, 211 K; 354/25; 356/122-126

[56] References Cited
UNITED STATES PATENTS
3,542,475   11/1970   Cooper ............................. 356/124
3,714,524   1/1973    Katsuyama......................... 356/125
3,833,806   9/1974    Sato ................................... 356/125

Primary Examiner—Alfred E. Smith
Assistant Examiner—Richard A. Rosenberger
Attorney, Agent, or Firm—Wolder & Gross

[57] ABSTRACT

A photoelectric focus detecting member includes a semiconductor substrate of a first polarity and at least two closely transversely spaced parallel longitudinally extending photosensitive laminae of a polarity opposite to the first polarity to form corresponding photodiodes. Each of the photosensitive laminae is masked to provide regularly spaced light receiving areas alternating with masked areas, the light receiving areas of successive transversely spaced photodiodes being relatively longitudinally offset to present a checkered pattern. The detecting element is positioned in the focal plane of a lens and is either stationary or oscillated. The difference in potential between the diodes or the amplitude of the AC current in a circuit including the photodiodes is a function of the condition of focus of the lens.

12 Claims, 7 Drawing Figures

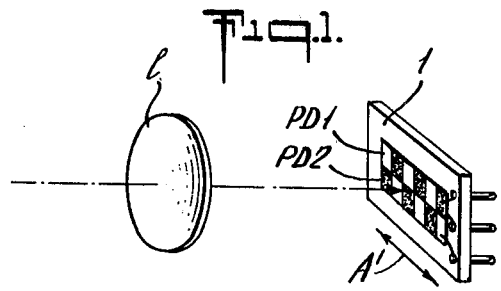
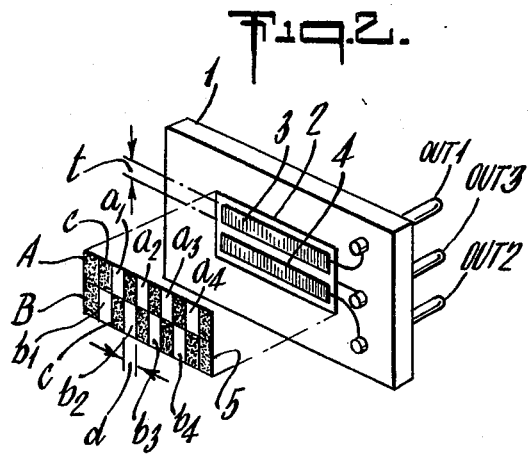
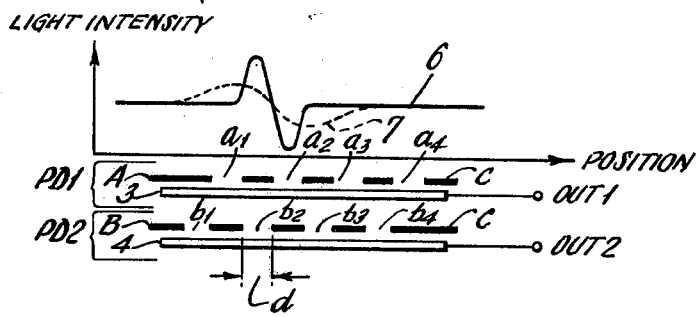
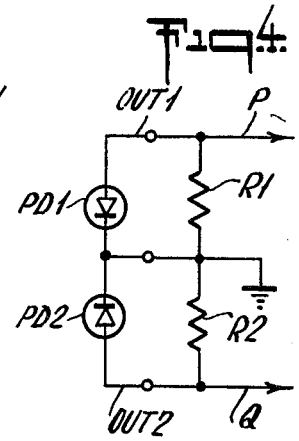
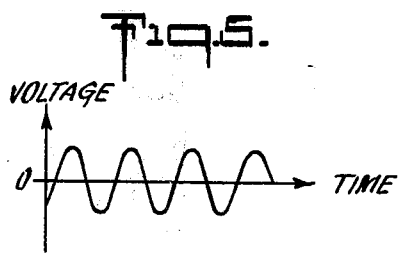
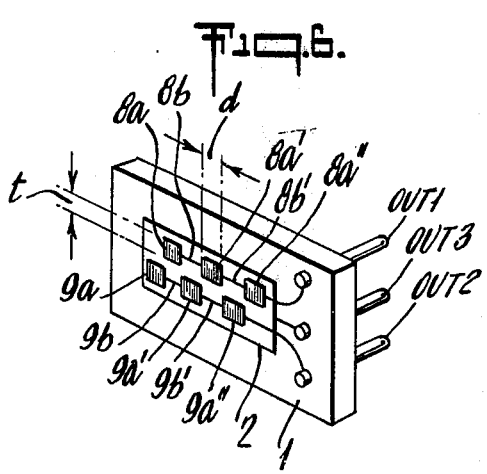
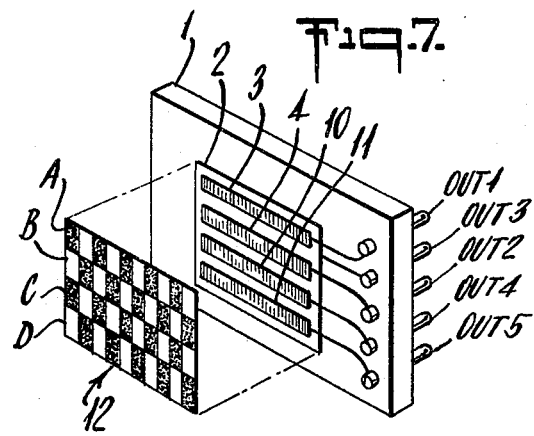

FOCUS DETECTING DEVICE

BACKGROUND OF THE INVENTION

The present invention relates generally to improvements in focus detecting devices and it relates more particularly to an improved photoresponsive member for sensing the condition of focus of a lens on a focal plane in an optical instrument such as a camera or the like.

An automatic focusing mechanism has heretofore been proposed in which a scanner having slits or pin holes therein is rotated or oscillated in a focusing plane in a direction at right angle to the optical axis of a lens to thereby scan an image, and the light which traverses the aforesaid slits or pin holes is received by stationary photodiodes to produce a oscillating or video signal, the high frequency component contained in the video signal being uses as a sensing signal for use in the automatic focusing. However, in the mechanisms of the above type, the device, including the scanner and the motor for driving the scanner occupies considerable space, thus resulting in incompatibility with a camera which is desired to be compact in size and light in weight. Furthermore, the aforesaid mechanism possesses the important drawback of an excessive amount of energy required for the scanner drive as well as very high power consumption. There has also been heretofore proposed an automatic focusing system in which the light receiving element itself is oscillated as a scanner, more particularly a photoconductor having slits is reciprocated in the focusing plane, as described in U.S. Pat. No. 3,830,571 filed on Dec. 19, 1972 and issued on Aug. 20, 1974. However, with the increase in the number of slits or apertures, the number of the output terminals of the element must be accordingly increased, with the resulting increase in the number of circuits associated therewith. In addition, there results a photoconductor presenting a poor response to low light, thus failing to scan at a higher oscillation cycle.

SUMMARY OF THE INVENTION

It is a principal object of the present invention to provide an improved focus detecting device.

Another object of the present invention is to provide an improved focus detecting device which overcomes the disadvantages and drawbacks of those heretofore proposed.

Still another object of the present invention is to provide an improved focus detecting device which is highly compact and suitable for use in cameras and highly responsive to high and low light conditions.

A further object of the present invention is to provide a focus detecting device having a minimum of electrical terminals, which is compact and of light weight, requires a minimum length reciprocation stroke and a minimum of power and current consumption.

Still a further object of the present invention is to provide a device of the above nature characterized by its high reliability and great versatility and adaptability.

The above and other objects of the present invention will become apparent from a reading of the following description taken in conjunction with the accompanying drawings which illustrate preferred embodiments thereof.

In a sense, the present invention contemplates the provision of a focus detecting device comprising first and second side-by-side longitudinally extending sets or groups of photoresponsive elements, advantageously photodiodes, the photosensitive element in each set being longitudinally spaced from each other and being longitudinally offset relative to the photosensitive elements in the other set to define a checkered pattern. In its preferred form, the improved device includes a semiconductor substrate of a first type or polarity having superimposed thereon at least two side-by-side strips of semiconductor of an opposite type or polarity. Masking overlies the strips to divide them into successive masked and unmasked areas, the respective areas of successive strips being longitudinally offset to provide a checkered pattern. A terminal is provided for the semiconductor substrate and each semiconductor strip. Alternatively, the semiconductor strips may be replaced by longitudinally spaced semiconductor laminae, the longitudinally spaced laminae being interconnected by conductors.

Although the detecting device is advantageously oscillated in the focusing plane for maximum resolution, stability and consistency, it may be satisfactorily employed in a stationary condition, and in either case, maximum response is provided at optimum focus and suitable circuits may be employed to achieve automatic focusing. The device is light and compact and requires a minimum of power and current consumption.

BRIEF DESCRIPTION OF THE DRAWINGS

FIG. 1 is a perspective view of a first embodiment of the present invention;

FIG. 2 is an exploded perspective view thereof;

FIG. 3 is a schematic view illustrating the operation of the first embodiment;

FIG. 4 is a circuit diagram showing one example of a circuit in which the first embodiment is connected;

FIG. 5 is a graph showing an example of an output of the circuit of FIG. 4;

FIG. 6 is a perspective view of a second embodiment of the present invention;

FIG. 7 is an exploded, perspective view, illustrating a modification of the first and second embodiments in comparison with the first embodiment.

DESCRIPTION OF THE PREFERRED EMBODIMENTS

Referring now to FIGS. 1 to 5 of the drawings which illustrate a first embodiment of the present invention, a focus detecting element having a pair of photodiodes PD1, PD2 is disposed in the focus reference plane of a lens $l$, the photodiodes being arranged in parallel on an insulating base plate 1, with the light receiving surface divided into plurality of areas which are positioned in mutually staggered relation.

As best seen in FIG. 2, a semiconductor substrate or base plate 2 is superimposed on the insulating base plate 1, and the semiconductor base plate is made, for instance, of $n$ type semiconductor. Semiconductors 3 and 4 are superimposed on substrate 2 and present light receiving surfaces of the photodiodes, and the semiconductors 3, 4 are made of a $p$ type, in contrast to the $n$ type of the semiconductor 2. Alternatively, the $n$ and $p$ types may be interchanged. The semiconductors 3, 4 with the substrate 2 define the aforesaid pair of photodiodes PD1, PD2, independently, due to the contact with semiconductor base plate 2, and connected to output terminals Out1 and Out2. Out3 is an output terminal connected to the semiconductor base plate 2. A mask 5 having a checkered pattern consists of transparent portions ai, bi (where $i$ is a given number) and opaque portions C, with the upper half A which consists of ai and C covering the light receiving surface of semiconductor 3 and with the lower half B which consists of bi and C covering the light receiving surface of semiconductor 4, respectively, thus dividing the light receiving surfaces of phtodiodes PD1, PD2 into light receiving photodiode element defining areas appearing in a staggered relation.

The aforesaid photodiodes and mask are advantageously prepared according to the known I.C. circuit technique. The semiconductors 3, 4 should preferably be as close to each other as possible whicle being mutually electrically insulated. The width $t$ of the semiconductors 3, 4 is advantageously of the order of several hundreds microns, and the width $d$ of the checkered pattern is advantageously of the order of several tens microns. The width $d$ may be derived from a consideration of a spatial frequency contained in an image formed by the objective lens. However, limitations arising from the aspects of the I.C. circuit technique or SN ratio are imposed thereon.

FIG. 3 illustrates the sensing operation of the above described focus detecting element according to the present invention, in which the variation in brightness is shown in relation to the position on the photodiodes PD1, PD2. As shown in FIG. 3 a dark light is incident through a transparent portion a2 of the mask on the semiconductor 3, while a bright light is incident through the transparent portion b2 of the mask on the semiconductor 4 as shown by the line 6 of FIG. 3. The light having uniform brightness is incident through the remaining transparent portions. Assuming that load resistors R1, R2 having equal resistance are connected to PD1 and PD2, as shown in FIG. 4, the semiconductor 4 receives more light than semiconductor 3, so that the photodiode PD2 produces more photocurrent to thereby produce a larger potential across the opposite ends of the resistor R2 than across the opposite ends of R1. In brief, a voltage corresponding to the difference in potential will appear across the terminals P, Q. On the other hand, if the distribution of brightness on the light receiving surface of the element is such shown by the broken line 7 due to off-focusing, the output between the terminals P, Q is reduced. Accordingly, in the network employing the focus detecting element of the present invention, the focus detecting may be achieved by obtaining the maximum value of the difference in voltages appearing between Out1 and Out3 and between Out2 and Out3. The detecting element described above may be used in a stationary condition, but in order to achieve a more stable or consistent output, the detecting element is advantageously oscillated in a direction parallel to the length of the semiconductors 3 and 4 as shown by the arrow A in FIG. 1. When the detecting element is shifted by a distance $d$ in parallel with the light receiving surface, then the light incident condition on the semiconductors 3 and 4 are reversed to that shown in FIG. 3, so that a voltage having a polarity reverse to that in the aforesaid case appears across the terminals P, Q. In addition, when the detecting element is oscillated at an amplitude of $d/2$, then an A.C. output appears across the terminals P, Q as shown in FIG. 5. As a result, by determining the maximum value of the amplitude of the A.C. output, there may be achieved a highly stabilized or consistent focus detection. In the aforesaid description, the distribution of the brightness of an image over the light receiving surface is so provided as to suit or enhance the detection. However, such a condition is commonly present in the case of an ordinary photographic object. In other words, there exists a contrast of light and shadow in an ordinary photographic object, and hence there exists a spatial frequency component on the boundary of the contrast, as shown in the uppermost portion of FIG. 3. Accordingly, it is possible in general, that the focusing may be achieved by detecting the position of an A.C. output across the terminals of P, Q which provides the maximum A.C. output, by oscillating the element.

A piezo-electric element for example, may be used as a means for oscillating the detecting element. In addition, a known circuit may be used for processing an output signal appearing across the terminals P,Q, it being noted that various methods may be utilized for the aforesaid purpose.

Referring now to FIG. 6 which illustrates a second embodiment of the present invention, an arrangement is used for achieving a pair of photodiode sets whose light receiving surfaces are divided into areas or sections disposed in a staggered relation. Specifically, a plurality of semiconductors $8a$, $9a$, $8a'$, $9a'$, $8a''$ and $9a''$ of the same size and of heights $t$ and widths $d$, are located on the semiconductor substrate or base plate 2 in a staggered relation to each other. In this instance, one group of semiconductors $8a$, $8a'$ and $8a''$ which are spaced in a line are connected by means of connecting wires $8b$ and $8b'$, while the other group of $9a$, $9a'$ and $9a''$ are connected by $9b$ and $9b'$, thereby presenting a focus detecting element, without using a mask 5 such as given in the first embodiment. As shown in FIG. 6, the two groups of semiconductors are connected to Out1 and Out2 respectively.

In FIG. 7 of the drawing there is illustrated another embodiment of the present invention of the nature of the first embodiment. There is provided in the modified detector element another pair of semiconductors 10 and 11 similar to the pair of semiconductors 3 and 4 and formed on the common semiconductor substrate or base plate 2 carrying the pair of semiconductors 3, 4. Shown at 12 is a mask of checkered pattern, which consists of C, D in addition to A, B of the mask as used in the first embodiment for the other pair of semiconductors 10, 11. In case more than two pairs of photodiodes are placed in the focus reference plane of a lens, more than two pairs of semiconductors may be formed on the common semiconductor base plate 2, thus presenting a unitary focus detecting element. In FIG. 7, the output terminals of a pair of photodiodes including semiconductors 10, 11 are shown at Out3, Out4 and Out5. According to the present embodiment, a wider range of focus reference plane may be covered, thus promoting the positiveness of the focus detection, as well as the accurate positioning of a plurality of pairs of light receiving surfaces on the same plane, because of the use of the common semiconductor base plate.

Further, it should be noted that the focus detectng element according to the present invention may be applied not only to a focus adjusting device of a camera, but also to the measurement of OTF of a lens.

While there have been described and illustrated preferred embodiments of the present invention, it is apparent that numerous alterations, omissions and additions may be made without departing from the spirit thereof.

I claim:

1. A focus detecting element positioned at a plane intended to be focussed by a lens for receiving light through the lens to produce an electrical signal, characterized in that said element comprises at least one pair of photodiodes elongated in longitudinal directions parallel to each other, each of said photodiodes having a light receiving surface divided into a plurality of longitudinally spaced areas along the elongated direction of said photodiode, the areas of one of said pair of diodes being longitudinally offset with respect to the areas of the other of said pair of diodes.

2. The focus detecting element according to claim 1, characterized in that said element comprises a mask having a plurality of windows arranged in checkerboard relation, a first photodiode having an elongated light receiving surface disposed at the rear of one group of said windows which are aligned along an edge of said mask, and a second photodiode having an elongated light receiving surface disposed at the rear of another group of said windows which are adjacently aligned to said first group of the windows.

3. The focus detecting element according to claim 2, characterized in that said element comprises a plurality of sets of said first and second photodiodes disposed at the rear of said mask.

4. The focus detecting element according to claim 2, characterized in that said first and second photodiodes are constructed of a base semiconductor having a first output terminal and first and second semiconductors with a space left therebetween, mounted on said base semiconductor for forming said light receiving surfaces of said first and second photodiodes respectively, said first and second semiconductor having second and third output terminals, respectively.

5. The focus detecting element according to claim 1 characterized in that said element comprises a base semi-conductor having a first output terminal, a plurality of semi-conductors mounted on said base semi-conductor in a checkerboard arrangement, one group of said semi-conductors which are aligned along an edge of said base semi-conductor being electrically connected with each other to form the light receiving surface of one of said pair of photodiodes, and another group of said semiconductors which are adjacently aligned to said first group being electrically connected with each other to form the light receiving surface of the other of said pair of photodiodes, said two group of semiconductors having second and third output terminals, respectively.

6. The focus detecting element according to claim 1, including means for oscillating said element in parallel with said plane and along the direction of said elongated photodiodes.

7. The focus detecting element according to claim 6, characterized in that said oscillating means oscillates said element within a range determined by the distance between two successive areas of said light receiving surface of one of said photodiodes.

8. The focus detecting element according to claim 1, characterized in that said element comprises an insulator base, a base semiconductor mounted on said insulator base and having a first output terminal, first and second semi-conductors elongated in parallel with each other with a space left therebetween and mounted on said base semi-conductor, said first and second semi-conductors having second and third output terminals respectively, and a mask having a plurality of windows arranged in checkerboard like relation mounted on said first and second semi-conductors in a manner in which two neighboring lines of said windows are superimposed on said first and second semi-conductors, respectively.

9. A focus detecting device comprising first and second side-by-side longitudinally extending sets of photoresponsive elements, the photosensitive elements in each set being longitudinally spaced from each other and being longitudinally offset relative to the phtosensitive elements in the other set.

10. The device of claim 9 wherein said photoresponsive elements are photodiodes including first and second electrodes, the second electrodes being connected to a common first terminal and the first electrodes of the first and second sets of photodiodes being connected to respective second and third terminals.

11. The device of claim 9 wherein said sets of photosensitive elements are defined by a semi-conductor substrate of a first type, a pair of side-by-side longitudinally extending semi-conductor strips of a type different from said first type superimposed on said substrate to define photodiodes therewith, and masking overlying said semi-conductor strips and masking and exposing longitudinally spaced alternate areas thereof.

12. The device of claim 11 wherein said alternate masked and exposed areas are of substantially equal lengths, the masked areas of the first and second sets being relatively longitudinally offset.

* * * * *